US007495379B2

(12) United States Patent
Nishimura et al.

(10) Patent No.: US 7,495,379 B2
(45) Date of Patent: Feb. 24, 2009

(54) FLUORESCENT LAMP AND ILLUMINATING APPARATUS

(75) Inventors: Kiyoshi Nishimura, Kanagawa-ken (JP); Miho Watanabe, Kanagawa-ken (JP); Kiyoshi Otani, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 331 days.

(21) Appl. No.: 11/453,052

(22) Filed: Jun. 15, 2006

(65) Prior Publication Data

US 2006/0284561 A1 Dec. 21, 2006

(30) Foreign Application Priority Data

Jun. 17, 2005 (JP) ............................ 2005-178337

(51) Int. Cl.
*C09K 11/02* (2006.01)

(52) U.S. Cl. ........................ 313/489; 313/486; 313/487

(58) Field of Classification Search ................. 313/489, 313/491, 493, 486, 487, 570, 572
See application file for complete search history.

(56) References Cited

U.S. PATENT DOCUMENTS 4,916,359 A * 4/1990 Jonsson ...................... 313/489

FOREIGN PATENT DOCUMENTS

| | | |
|---|---|---|
| JP | 58-152365 | 9/1983 |
| JP | 3-55769 | 3/1991 |
| JP | 3055769 | 4/2000 |
| JP | 2004-6185 | 1/2004 |

* cited by examiner

*Primary Examiner*—Joseph L Williams
(74) *Attorney, Agent, or Firm*—Finnegan, Henderson, Farabow, Garrett & Dunner, L.L.P.

(57) ABSTRACT

An object of the present invention to provide a fluorescent lamp in which after formation of a phosphor layer, a glass bulb is bent and in which the phosphor layer is not subject to cracking or peel-off even in bent parts with a small radius of curvature, thus offering a good appearance. A fluorescent lamp includes a glass bulb 1 having bent parts, a protective film 2 having a fine grain layer 2*a* comprising fine grains of average grain size at most 100 nm and attached to an inner surface of the glass bulb, and large-sized grains some of which are buried in the fine grain layer 2*a*, the other large-sized grains projecting from the fine grain layer 2*a*, a phosphor layer 3 formed on the protective film 2 of the glass bulb 1, discharge inducing means 4, 4 sealably installed in opposite ends of the glass bulb 1, and a discharge medium sealed in the glass bulb 1.

5 Claims, 4 Drawing Sheets

FLUORESCENT LAMP AND ILLUMINATING APPARATUS

BACKGROUND OF THE INVENTION

1. Field of the Invention

The present invention relates to a preferable fluorescent lamp in which after formation of a phosphor layer, a glass bulb is heated and softened so as to be bent and molded, and an illuminating apparatus having the same.

2. Description of the Related Art

Japanese Patent No. 3055769 describes a straight tube-shaped, annular, or single-base-type fluorescent lamp known as a common illuminating fluorescent lamp, and in particular, a small-diameter annular fluorescent lamp dedicated to high-frequency lighting and which meets recent requirements for energy and resource saving. This small-diameter annular fluorescent lamp is identified by the commercial model name "FHC". Compared to conventional annular fluorescent lamps, the small-diameter annular fluorescent lamp has almost the same annular outer diameter but can offer a reduced outer tube diameter and a comparable or improved lamp efficiency or brightness. The small-diameter annular fluorescent lamp can thus meet the needs for energy and resource saving, and in particular, provides a comfortable visual environment in a residential space.

On the other hand, Japanese Patent Laid-Open No. 58-152365 describes a rectangular fluorescent lamp. This 30-W type rectangular fluorescent lamp uses a square bulb having an outer tube diameter of 25 to 32 mm, a radius of curvature of 20 to 40 mm inside its bent part, and an outer dimension of 190 to 220 mm between opposite straight parts. Another rectangular fluorescent lamp is known which is of a 32-W type and which has an outer dimension of 260 to 290 mm between the opposite straight parts.

Blackening of the glass caused by implantation of mercury can be suppressed by, in forming a fluorescent layer on an inner surface of the fluorescent lamp, forming a protective film before forming a fluorescent layer on an inner surface of the protective film. The protective film is commonly formed by applying an applicator of fine grains such as $\gamma$-$Al_2O_3$ to the inner surface of the glass bulb, drying the applicator, and heating and sintering the glass bulb. If the fluorescent lamp is bent, the step of forming a protective film and a phosphor layer and the step of molding a glass bulb have an arbitrary sequential relationship; molding of a glass bulb as described above may precede or follow formation of a protective film and a phosphor layer. However, for a small-diameter fluorescent lamp shaped like a rectangle or the like, forming a protective film and a phosphor layer before molding a glass bulb is suitable for mass production.

Japanese Patent Laid-Open No. 2004-006185 describes a technique for using strontium phosphate ($Sr_2P_2O_7$) fine grains with a relatively large grain size as a material for a protective film in order to reduce the amount of fluorophor used in the fluorescent lamp.

However, it has been known that when a fluorescent lamp having small-diameter bent parts with a small radius of curvature such as corners of a rectangle is manufactured on the basis of the prior art, the phosphor layer in the bent part is prone to be cracked or peeled off. This may disadvantageously degrade the appearance of the fluorescent lamp. On the basis of their examinations, the present inventors assume that if the glass bulb is molded by heating and softening it and when the glass in the bent portions is shrunk, the protective film is not shrunk accordingly. The protective film shown in Japanese Patent Laid-Open No. 2004-006185 has not been sufficiently examined for the relationship between cracking of the phosphor layer which may occur during formation of bent parts and the configuration of the protective film.

SUMMARY OF THE INVENTION

An object of the present invention is to provide a fluorescent lamp in which after formation of a phosphor layer, a glass bulb is bent and in which the phosphor layer is not subject to cracking or peel-off even in bent parts with a small radius of curvature, thus offering a good appearance, and an illuminating apparatus having the same.

A fluorescent lamp according to the present invention is characterized by comprising a glass bulb having bent parts; a fine-grain layer comprising fine grains of average grain size at most 100 nm and attached to an inner surface of the glass bulb and a protective film having large-sized grains some of which are buried into the fine grain layer, the other large-sized grains projecting from the fine grain layer; a phosphor layer formed on the protective film of the glass bulb; a discharge medium enclosed in the glass bulb; and discharge inducing means for generating discharge inside the glass bulb.

In this and other aspects of the present invention, the following terms have definitions and technical meanings described below unless otherwise specified.

<Glass Bulb> The glass bulb may be composed mainly of a glass tube and may have bent parts with a small radius of curvature (hereinafter simply referred to as "bent parts" for convenience). By way of example, the glass bulb may have one or more bent parts and one or more straight tube parts and adopt a generally closed shape. The shape of the glass bulb may vary, for example, a rectangle, a modified annular shape in which the straight parts of a D shape are separate from and parallel to each other, or a shape composed of more parts linked together so as to form a single discharge path.

The tube length of the glass tube is not particularly limited and can thus be set at an appropriate value as required.

If the glass bulb has bent parts, these parts can be formed as follows. A protective film and a phosphor layer, both described later, are sequentially formed on the inner surface of a raw glass tube shaped like a single straight tube. Paired electrodes are then sealably installed in the opposite ends of the raw glass tube to form a glass bulb. Those parts of the glass bulb in which the bent parts are to be formed are locally heated and bent. The bent part can have a length equal to 15 to 50% of center axis length of the glass bulb. The bent part may internally have a radius of curvature at most three times, preferably at most twice as large as the outer diameter of the glass tube. The bent part may be obtained simply by bending a straight glass tube or by using a mold to shape the glass tube after the bending as required. The single straight glass tube may be a single raw tube or may be obtained by joining a plurality of raw straight glass tubes. In the latter case, a plurality of raw glass tubes may be bent before their ends are joined together.

The glass bulb may include one or more straight tube parts in addition to the above bent parts. The straight tube part in this case may have an inner tube diameter of 12 to 20 mm. However, the optimum range of the inner diameter is between 14 and 18 mm when lamp characteristics such as lamp efficiency and manufacture conditions are taken into account. A portion of the straight tube part which is close to the bent part may have its outer tube diameter slightly changed during formation of the bent part. Accordingly, the outer tube diameter of this portion may deviate partially from the above range. The glass bulb desirably has a thickness of about 0.8 to 1.2 mm in the straight tube part or an insignificantly bent part with a large radius of curvature.

It is known that a reduction in the tube diameter of the fluorescent lamp increases the lamp efficiency. However, the outer tube diameter may be preferably set at 20 mm or less in the straight tube part or an insignificantly bent part. An outer tube diameter of at most 20 mm enables the achievement of a lamp efficiency equal to or higher than that of the conventional small-diameter annular fluorescent lamp. In contrast, an outer tube diameter of less than 12 mm makes it difficult to provide a proper mechanical strength for a glass bulb having bent parts and prevents the achievement of an optical output equivalent to that of a conventional annular fluorescent lamp of the same size. This outer tube diameter is thus not practical.

To increase the lamp efficiency of a conventional annular fluorescent lamp (model name "FCL") with an outer tube diameter of 29 mm by at least 10%, it is necessary to reduce the outer tube diameter to at most 65%. In other words, the glass bulb desirably has an outer tube diameter of at most 18 mm. This outer tube diameter enables the thickness of the fluorescent lamp to be sufficiently reduced. With the characteristics such as the optical output and lamp efficiency taken into account, the straight tube part preferably has an outer tube diameter of at least 14 mm.

A glass bulb shaped like a polygon that is suitable for the present invention has at least three straight tube parts. If the opposite ends of a glass bulbs are placed opposite each other to form one corner, the number of bent parts each connecting straight tube parts together is smaller than that of straight tube parts by one. The bent part is bent so that the corresponding straight tube parts are located on almost the same plane. The free ends of straight tube parts located on the respective sides of a bent part seal a stem; the bent parts are not connected to the free ends. Alternatively, the straight tube parts are provided with respective pinch seal parts. The opposite ends of the straight tube parts are placed in proximity to each other to form a generally polygonal glass bulb. In addition, when the fluorescent lamp is of an electrode type, the stem or the pinch seal parts may sealingly support an electrode mount that supports electrodes.

Two aspects described below are possible in which multiple glass bulbs shaped generally like a polygon form a single discharge path. In a first aspect, an outer and inner annular parts are concentrically arranged in almost the same plane. In a second aspect, a plurality of annular parts of almost the same size lie on top of each other. In either aspect, the protective film and phosphor layer described later are formed in a raw straight glass tube. Paired electrodes are then sealably installed in the respective opposite ends of the raw glass tube to form a straight tube-like glass bulb. The glass bulb is then heated and softened and then molded into an annular shape. Connection tubes are then used to connect a plurality of the annular parts together to form a single discharge path.

The glass bulb is formed of soft glass such as soda lime glass, barium silicate glass, or lead glass but may be made of hard glass such as boro-silicated glass or quartz glass as required. The straight tube parts of the glass bulb desirably have a thickness of about 0.8 to 1.2 mm. However, the present invention is not limited to this. A thin tube or a pair of thin tubes may be provided in order to exhaust the glass bulb and to seal the discharge medium in the glass bulb.

<Protective Film> The protective film has the fine grain layer and large-sized grains. The fine grain layer has an average grain size of at most 100 nm, and preferably at least 10 nm. The fine grain layer is attached to the inner surface of the glass bulb. The fine grains are composed of a metal oxide such as silica or γ alumina which is conventionally used as a common component of the protective film and which has a primary average grain size of at most 100 nm, preferably an average grain size of about 10 to 50 nm. Fine grains of average grain size at most 100 nm can serve as a protective film that suppresses implantation of mercury in the glass bulb. Fine grains of average grain size less than 10 nm are difficult to manufacture and thus hard to obtain, or lead to an increase of the cost, and when these fine grains are dispersed in a suspension for applying a protective film, they are prone to cohere, making it difficult to provide a compact film.

The fine grains used to form a fine grain layer are preferably spherical or have a similar shape. In particular, when the area of orthogonal projection image of the fine grains is defined as S1 and the area of circumscribed circle of the orthogonal projection image is defined as S2, it is desirable to meet the expression $0.7 \leqq S1/S2 \leqq 1.0$.

Means for forming fine grains is not particularly limited. For example, when silica is used as fine grains, the fine grains are preferably used, which are formed of silicon or a silicon compound gasified or liquefied by a PVS (Physical Vapor Synthesis) process or the like in an atmosphere containing oxygen. $SiO_2$ thus formed adsorbs less impurity gas and has a high integrity. The $SiO_2$ thus enables provision of a fluorescent lamp which has a strong protective film and which can properly maintain luminous fluxes.

The large-sized grains act as a component of the protective film when some of them are buried in the fine grain layer, while the others project from the fine grain layer toward the discharge space with a moderate gap formed between the grains. Thus, since many fine grains never exist and a porous film is formed between the large-sized grains on the discharge space side, fluorophor grains penetrate into the gap between the large-sized grains, thereby preventing peeling-off of the phosphor layer. Some of the large-sized grains may isolate themselves from the fine grain layer independently or together with the fine grains to mostly enter a base layer of the phosphor layer. This serves to enhance the binding between the large-sized grains and the fluorophor grains. The large-sized grains have, for example, an average primary grain size of at least 1 μm. The large-sized grains preferably have an average grain size of about 1 to 10 μm, more preferably an average grain size of about 2 to 7 μm. Accordingly, the grain size of the large-sized grains may be within the same range as that of grain size of common fluorophor grains. Moreover, fluorophor grains may be used as the large-sized grains.

The large-sized grains may be one selected from a group consisting of an alkali earth metal salt, α alumina, and a fluorophor, or their mixture. The alkali earth metal salt may be one selected from a group consisting of an alkali earth metal phosphate and an alkali earth metal aluminate, or their mixture.

If a fluorophor is used as large-sized grains, the fluorophor may be homogenous or heterogeneous to that forming the phosphor layer described below. However, since the large-sized grains acting as a protective film have such a portion that some of them are buried in the fine grain layer, while the others project from the fine grain layer toward the discharge space, as described above, this fluorophor can be distinguished from that of the phosphor layer even if they are homogeneous.

Means for forming a protective film on the inner surface of the glass bulb is not particularly limited. For example, a suspension containing fine grains and large-sized grains in a predetermined ratio is prepared and allowed to flow down through the raw glass tube. The fine grains and large-sized grains attached to the raw glass tube are then dried. This makes it possible to form a fine grain layer on the inner surface of the raw glass tube as well as a protective film in which some of the large-sized grains are buried in the fine grain layer, while the others project from the fine grain layer with a moderate gap formed. As described below, after the protective film is formed on the inner surface of the raw glass tube, a phosphor layer is formed. Electrodes are then attached to the raw glass tube to form a glass bulb, which can be then bent to form bent parts.

Consequently, the preferred combination of average grain sizes of the fine grains and large-sized grains in the protective film is such that the average grain size of the former is at most 50 nm, whereas the average grain size of the latter is between 1 and 10 μm. More preferably, the fine grains have an average grain size of 10 to 40 nm, whereas the large-sized grains have an average grain size of 2 to 7 μm.

Next, when the suspension is prepared, the amount of large-sized grains may preferably account for 50 to 90%, more preferably at most 85% or/and at least 55% of the total mass of the large-sized grains and fine grains. Consequently, the amount of fine grains may preferably account for 50 to 10%, more preferably at least 15% or/and at most 45% of the total mass of the large-sized grains and fine grains. When the mass of the fine grains is defined as Wg and the mass of the large-sized grains is defined as Wp, the above ranges are such that the mass ratio Wg:Wp=15 to 45:85 to 55.

The quantity of luminous fluxes from the fluorescent lamp tends to decrease as the content of the large-sized grains decreases from the above range. Although depending on the amount of protective film applied, the quantity of luminous fluxes from the fluorescent lamp is also likely to decrease when the content of the large-sized grains exceeds the above range.

Further, when the film thickness of part of the fine grain layer which is located on the inner surface of the glass bulb is defined as t (μm), and the average grain size of the large-sized grains is defined as p (μm), the preferred range of film thickness of the protective film meets the expression $0<t/p<1$. This range ensures that a structure in which some of the large-sized grains are buried in the fine grain layer and the others project from the fine grain layer can be reliably and easily formed, providing a preferred aspect. Within this range of the expression, the surface of the protective film is smoother as the ratio t/p is closer to 1. The surface of the protective film has many gaps formed thereon and is more uneven as the ratio t/p is closer to 0. The ratio t/p of 1 precludes the effects of the present invention from being exerted. Moreover, the increased absolute value of the protective film thickness often causes cracking or peel-off of the film or emission of impurity gases.

<Phosphor Layer> The phosphor layer is formed on the inner surface of protective film formed on the inner surface of the glass bulb, that is, the surface exposed to the discharge space. Accordingly, as is apparent from the above description, the phosphor layer is coated and formed on the inner surface of the straight tube-like bulb before bent parts are formed. The phosphor layer may contain about 1 to 3% of fine grains as a binder for the fluorophor grains and for the protective film. The fine grains in this case preferably consist of metal oxide that may be one or more oxides selected from a group consisting of, for example, γ alumina, yttrium, silica, zinc oxide, titanium, and cerium. The fine grains in the protective film may be homogenous or heterogeneous to those in the phosphor layer.

The phosphor layer has an appropriate film thickness, but the amount of fluorophor attached to the a major part of the inner surface of the glass value is preferably about 3 to 7 $mg/cm^2$ on the average. In the bent part, the phosphor layer is preferably formed so that the deviation, from the average value, of amount of fluorophor attached is ±15%. Moreover, the phosphor layer may be formed on the protective film by allowing an applicator for the phosphor layer to flow through the raw glass tube from one end, the protective film having been formed on the inner surface of the raw glass tube. In this case, by forming a phosphor layer by allowing a fluorophor applicator to flow through the raw tube from its end located opposite the end from which the protective film applicator has been flowed in, it is possible to more easily make the total thickness of the protective film and phosphor layer uniform over the entire length of the raw tube. The phosphor layer may be a multilayer, for example, maybe composed of two layers. In this case, the applicator is allowed to flow in from both ends of the raw tube. Alternately switching the flow-in end makes the thickness of the phosphor layer uniform in the longitudinal direction of the raw tube.

If at least some of the large-sized grains in the protective film are fluorophor grains, the boundary between the protective film and the phosphor layer in the present invention is unclear. However, the protective layer is formed by attaching the fine grain layer to the inner surface of the glass bulb so that some of the large-sized grains are buried in the fine grain layer, while the others project from the fine grain layer, as previously described. This makes it possible to distinguish the protective film from the phosphor layer.

<Discharge Inducing Means> The discharge inducing means induces discharge inside the glass bulb, that is, discharging of the discharge medium. The present invention allows either known electrode or electrodeless type discharge inducing means to be appropriately selectively employed. The electrode type discharge inducing means may be either of an internal electrode type in which the electrodes are disposed in the inside of the glass bulb or of an external electrode type in which the electrodes are disposed on the outer surface of the glass bulb. Moreover, the external electrode type includes an aspect in which the paired electrodes are both disposed opposite each other on the outer surface of the glass bulb and an aspect in which one of the electrodes is disposed on the outer surface of the glass bulb, whereas the other is disposed on the inner surface of the glass bulb. The present invention is applicable to either aspect. However, the electrode type discharge inducing means is preferable for general illuminating fluorescent lamps.

<Discharge Medium> The discharge medium is sealed in the glass bulb, and discharging is induced in the discharge medium by the discharge inducing means, resulting in radiation. With respect to the specific configuration of the discharge medium, any of various known discharge media may be appropriately selected to cause desired radiation. However, it is common to use a combination of a start gas, for example, a rare gas, and a luminous medium for causing the desired radiation, for example, mercury.

<Operation of the Present Invention> For example, for a glass bulb with an outer diameter of 16 mm, bent parts with an inner radius of curvature of 30 mm have an expansion rate of at least 1.6 times on its outer side. However, in the present invention, since the protective film is formed as described above, the large-sized grains in the protective film connect readily to the fluorophor grains in the phosphor layer. Consequently, in bent parts generally having smaller radii of curvature, the phosphor layer is unlikely to be cracked or peeled off. This prevents bent parts having smaller radii of curvature from being cracked or peeled off.

In addition, when fluorophor grains are used as large-sized grains in the protective film, the need to apply a large number of fluorophors in order to accomplish a desired luminous efficiency is eliminated. This is economical.

The present invention comprises the fine grain layer, and the protective film in which some of the large-sized grains are buried in the fine grain layer, while the others project from the fine grain layer. This prevents the phosphor layer from being cracked or peeled off even in bent parts having smaller radii of curvature. The present invention can thus provide a fluorescent lamp that appears fine, and an illuminating apparatus having the same.

Also, the thickness of the fine grain layer in the protective film is smaller than the average grain size of the large-sized grains. The first aspect thus provides a fluorescent lamp that allows the easy formation of a protective film in which some of the large-sized grains are buried in the fine grain layer, while the others project from the fine grain layer, and an illuminating apparatus having the same.

DETAILED DESCRIPTION OF THE PREFERRED EMBODIMENTS

With reference to the drawings, description will be given of embodiments for implementing a fluorescent lamp and an illuminating apparatus of the present invention.

Figure 1:
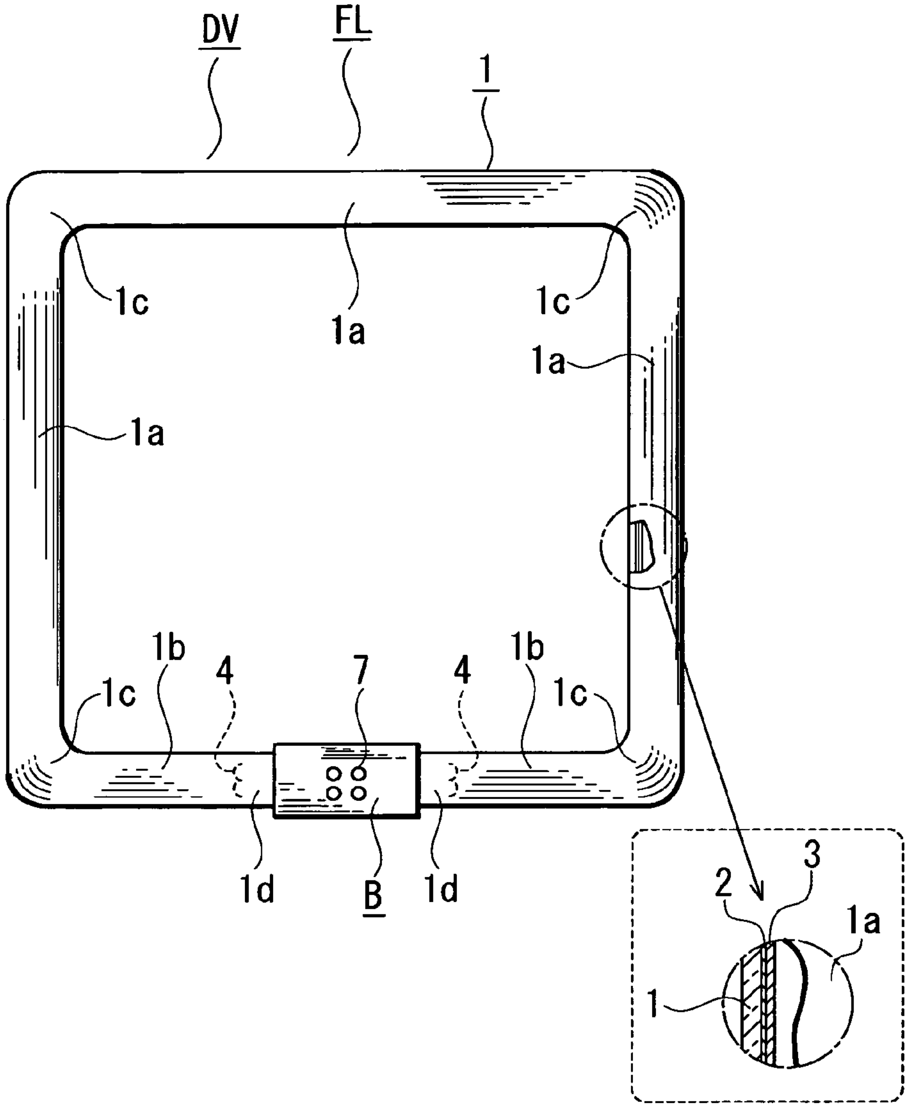
FIG. 1 is a front view of a first embodiment for implementing a fluorescent lamp of the present invention, with an enlarged sectional view of a part of the fluorescent lamp.
Figure 2:
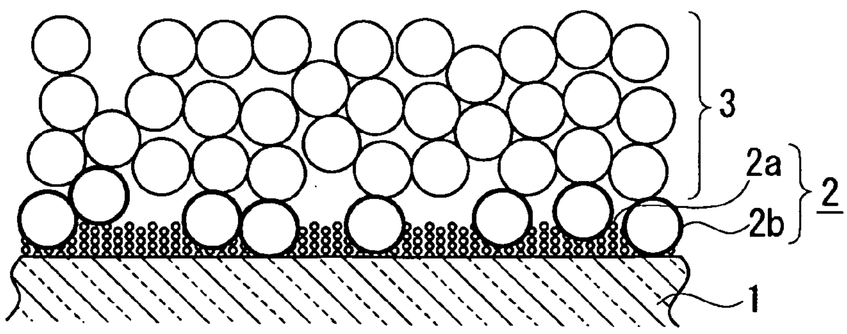
FIG. 2 is a sectional view schematically showing an essential part of a protective film and a phosphor layer in an enlarged view.
Figure 3:
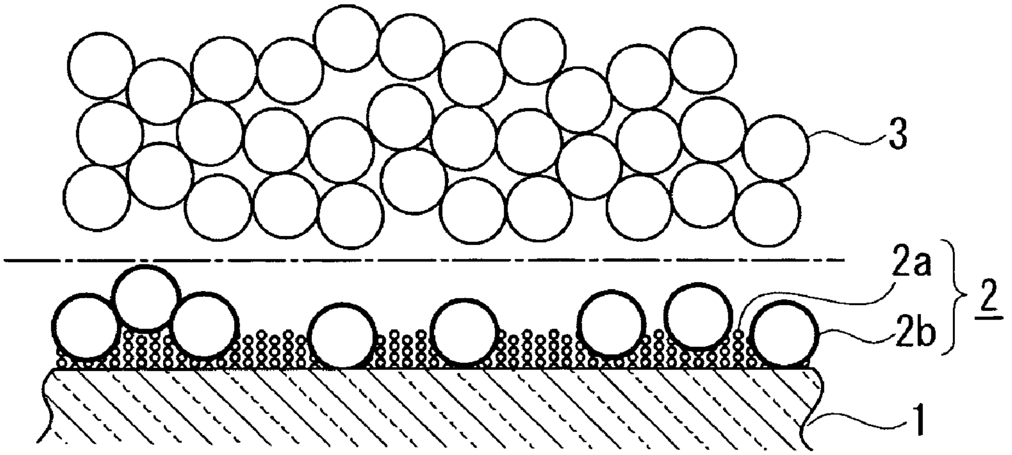
FIG. 3 is an exploded sectional view schematically showing, in an enlarged view, an essential part of a process of manufacturing a protective film.

FIGS. 1 to 3 show a first embodiment for implementing a fluorescent lamp of the present invention. FIG. 1 is a front view showing the fluorescent lamp, which is partly shown in an enlarged sectional view. FIG. 2 is an enlarged sectional view schematically showing an essential part of a protective film and a phosphor layer. FIG. 3 is an enlarged exploded sectional view schematically showing an essential part of a process of manufacturing a protective film. In the figures, a fluorescent lamp FL comprises a glass bulb 1, a protective layer 2, a phosphor layer 3, discharge inducing means 4, 4, a discharge medium, and a base B.

In the glass bulb 1, a bent part with a small radius of curvature is formed by locally heating and softening a raw glass tube. The glass bulb 1 is generally square and is formed of three relatively long straight tube parts 1*a* constituting three sides of the square, a pair of relatively short straight tube parts 1*b*, and four bent parts 1*c* forming respective corners. The paired relatively short straight tube parts 1*b* have respective straight ends 1*d*, that is, leading ends located close to and opposite each other to form a thin tube (not shown).

The three straight tube parts 1*a* and the pair of straight tube parts 1*b*, 1*b* constitute the four adjacent sides of the square. The base B as described later is installed so as to act as a bridge between the leading ends of the pair of straight tube parts 1*b*, 1*b*. A closed square is thus formed. Each of the bent parts 1*c* connects the paired adjacent straight tube parts 1*a* together at right angles. The ends 1*d* of the paired straight tube parts 1*b*, 1*b* are sealed by sealing flare stems of electrode mounts (not shown) to the ends of the respective raw glass tubes before bending the raw glass tube as described later.

The electrode mount is an assembly consisting of the flare stem, a thin tube, discharge inducing means 4, and a lead wire and is integrally pre-assembled. The pair of them are sealed together by glass welding the flare part of each flare stem to the end of the corresponding raw glass tube. Then, the following operations are performed: sealing of the glass bulb 1, connection of thin tubes described later to the glass bulb 1, sealable installation of the discharge inducing means 4 described later, and leading of lead wires out from the discharge inducing means 4. A constricted part (not shown) is formed at each of the opposite ends 1*d* of the glass bulb 1 by molding when the flare stems are sealed to the ends 1*d*. However, the sealing may be carried out using another known sealing structure as desired, for example, a pinch seal structure in which electrode mounts with no stem glass are sealed directly to the ends or a structure in which electrode mounts with button or bead stems are sealed to the ends via the stem glass.

The protective film 2 and phosphor layer 3 described later are formed and stacked on the inner surface of the glass bulb 1 that is still in the form of a straight raw glass tube. The pair of electrodes 4, 4 is then sealably installed in the glass bulb 1, which is then locally heated and softened. The glass bulb 1 is thus molded so that the four bent parts 1*c*, three straight tube parts 1*a*, and pair of straight tube parts 1*b* form a general square. These parts are connected together and arranged on the same plane. In this case, each side of the glass bulb 2 preferably has a length L of at least 200 mm; in the present embodiment, the length L is about 300 mm. The straight tube part 1*b* has an outer tube diameter of 12 to 20 mm and a thickness of 0.8 to 1.5 mm. In the present embodiment, the straight tube part 1*b* has an inner tube diameter of about 16 mm and a thickness of about 1.2 mm.

As shown in FIG. 2, the protective film 2 is composed of a fine grain layer 2*a* and large-sized grains 2*b*. The fine grain layer 2*a* consists of silica of average grain size several tens of nm attached to the inner surface of the glass bulb 1 as a compact film. The fine grain layer 2*a* has a film thickness of, for example, 2 to 3 μm. Each of the large-sized grains 2*b* consists of a fluorophor grain of average grain size 5 μm. Some of the large-sized grains 2*b* are buried in the fine grain layer 2*a*, while the others project from the fine grain layer 2*a*. Since few silica fine grains exist between the large-sized grains 2*b* on the discharge space side (the phosphor layer 3 side), a gap of the same order of dimension as the average grain size of the large-sized grains 2*b* is formed between the large-sized grains 2*b*. The phosphor layer 3 is formed in such a manner that the fluorophor grains penetrate into the gap.

The protective film 2 is formed by, before forming a phosphor layer 3, allowing a suspension prepared in advance to flow-down through the glass tube and then drying the suspension, as shown in FIG. 3. The suspension maybe composed of a fluorophor homogeneous to the phosphor layer 3, described later, and fine grains the weight of which is 10 to 60% of that of the fluorophor, which are mixed and suspended in a solvent such as water. In an example in which the mass ratio of the silica fine grains to fluorophor grains in the suspension was 30%, an appropriate protective film 2 was obtained. The fine grain layer 2*a* is formed by applying the suspension to the inside of the glass tube with a surface tension when the suspension is applied to the inner surface of the glass tube. Also, when the phosphor layer 3 is applied and formed on the protective film 2, the gap is formed between the large-sized grains 2*b* by the silica fine grains between the large-sized grains 2*b* being flowing out to the inner surface of the glass tube.

The phosphor layer 3 is disposed on the protective film 2, that is, closer to the discharge space. The phosphor layer 3 is formed by adding 2 mass % of fine grains homogeneous to the protective film to grains of a three-band fluorophor, to prepare a suspension, applying the suspension to the phosphor layer 3 and then drying the suspension, and finally sintering the phosphor layer 3 together with the protective film 2. The phosphor layer 3 has a film thickness of about 10 to 30 μm. Examples of applicable three-band fluorophors include $BaMg_2Al_{16}O_{27}$: $Eu^{2+}$, a blue fluorophor having an emission peak wavelength in the vicinity of 450 nm, $(La,Ce,Tb)PO_4$, a green fluorophor having an emission peak wavelength in the vicinity of 540 nm, and $Y_2O_3$: $Eu^{3+}$, a red fluorophor having an emission peak wavelength in the vicinity of 610 nm. The present invention is not limited to these fluorophors.

When excited by ultraviolet rays mainly of wavelength 254 nm emitted by mercury vapor discharge of the discharge medium described later, the phosphor layer 3 generates, for example, white light of correlated color temperature 5,000 K. However, the fluorescent lamp 3 can also be constructed using another well-known fluorophor such as a halo phosphate fluorophor as required.

The discharge inducing means 4, 4 consist of a pair of electrodes of an inner electrode type in the present embodiment. The electrodes constituting discharge inducing means 4 are of a filament type and each consist of a triple coil of tungsten to which an electron emissive material is applied. The paired electrodes are sealably installed at the opposite ends 1*d*, 1*d* of the glass bulb 1. The discharge inducing means 4, 4 are supported by joining together the inner ends of a pair of lead wires sealed to the flare stems.

The discharge medium consists of rare gas and mercury vapor. As rare gas, argon (Ar) is sealed in the glass bulb at a low pressure, for example, about 320 Pa. Instead of or in addition to argon (Ar), one or more rare gases such as neon (Ne) or Krypton (Kr) may be selectively sealed in the glass bulb. The mercury vapor is supplied by a main amalgam 6 that consists of bismuth (Bi)-tin (Sn)-lead (Pb) to control the mercury vapor. The main amalgam 6 is held in a thin tube 1*e*. In addition to the main amalgam 6, an auxiliary amalgam may be used as required. The auxiliary amalgam consists of an indium (In) film plated to a stainless steel substrate. The auxiliary amalgam reacts with the mercury vapor in the glass bulb 1 to form amalgam and supplies mercury vapor mainly at the time of starting to facilitate a rise of a luminous flux. To keep the mercury vapor, serving as a discharge medium, at a predetermined pressure, the present embodiment uses the main amalgam 6 that controls the mercury vapor pressure. However, liquid mercury can also be used by shaping the cross section of bent part 2*c* of the glass bulb 1 like a general triangle or rectangle so that the bent part 2*c* corresponds to the coolest part. In other words, the outward projecting bent part 2*c* allows a discharge path to be formed inside, thus increasing the size of a non-discharge area. This makes it possible to obtain the optimum coolest part, which exerts a high cooling effect. As a result, temperature characteristics can be improved without any amalgam for controlling the mercury vapor pressure.

The base B comprises four base pins 7 that create a bridge between the opposite ends 1*d* of the pair of straight tube parts 1*b*, 1*b* of the glass bulb 1 so as to form each side of a square. The base pins 7 are connected to the lead wires (not shown) led out from the electrodes 4.

In the present embodiment, a fluorescent lamp FL has the following dimensions. In a fluorescent lamp FL corresponding to a conventional 30-W type annular fluorescent lamp, the glass bulb 2 has an entire length L of 225 mm, an inner maximum width of 192 mm, an outer tube diameter of 16 mm, and a thickness of 1.0 mm. This fluorescent lamp has a rated lamp power of 20 W and a high-output-characteristic lamp power of 27 W. In a fluorescent lamp FL corresponding to a conventional 32-W type annular fluorescent lamp, the glass bulb 2 has an entire length L of 299 mm, an inner maximum width of 267 mm, an outer tube diameter of 16 mm, and a thickness of 1.0 mm. This fluorescent lamp has a rated lamp power of 27 W and a high-output-characteristic lamp power of 38 W. In a fluorescent lamp FL corresponding to a conventional 40-W type annular fluorescent lamp, the glass bulb 2 has an entire length L of 373 mm, an inner maximum width of 341 mm, an outer tube diameter of 16 mm, and a thickness of 1.0 mm. This fluorescent lamp has a rated lamp power of 34 W and a high-output-characteristic lamp power of 48 W.

Now, description will be given of operations in the present embodiment. A high-frequency voltage is applied to between the discharge inducing means 4, 4 via the base B. Low-pressure mercury vapor discharge occurs in a discharge vessel DV to light the fluorescent lamp FL, which thus exhibits a lamp power of at least 20 W, a lamp current of at least 200 mA, a tube wall load of at least 0.05 $W/cm^2$, and a lamp efficiency of at least 50 lm/W. The lamp current density of the straight tube part 1*b*, that is, the lamp current per cross section, is at least 75 $mA/cm^2$. In the present embodiment, the lamp exhibits a lamp power of 50 W, a lamp current of 380 mA, and a lamp efficiency of 90 lm/W.

Figure 4:
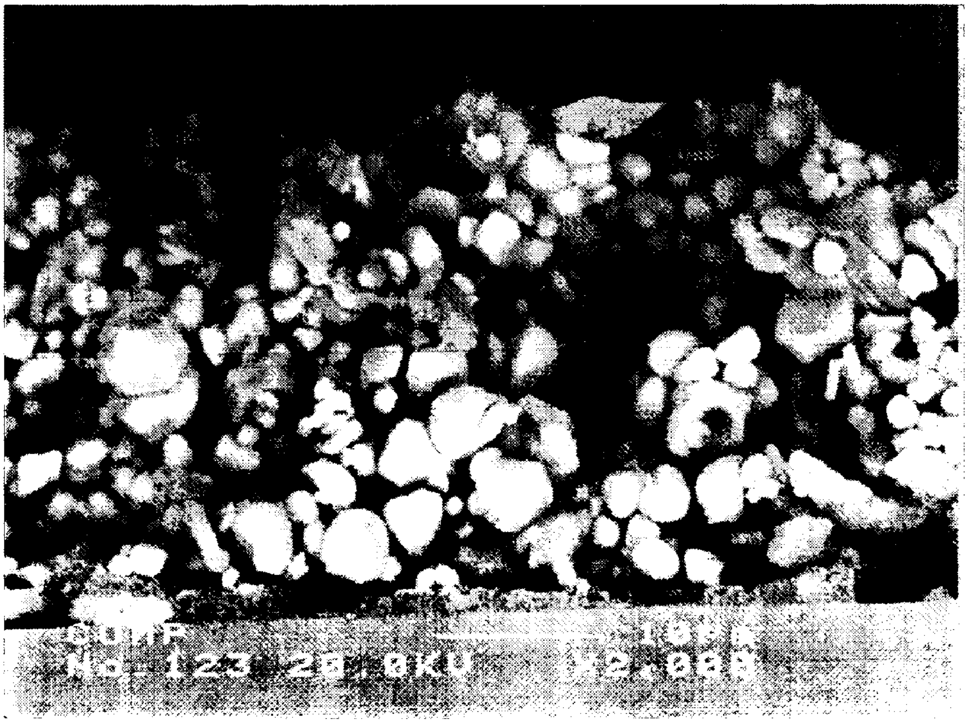
FIG. 4 is an electron micrograph showing a cross section of the protective film and phosphor layer in a straight tube part in an example of the present invention.
Figure 5:
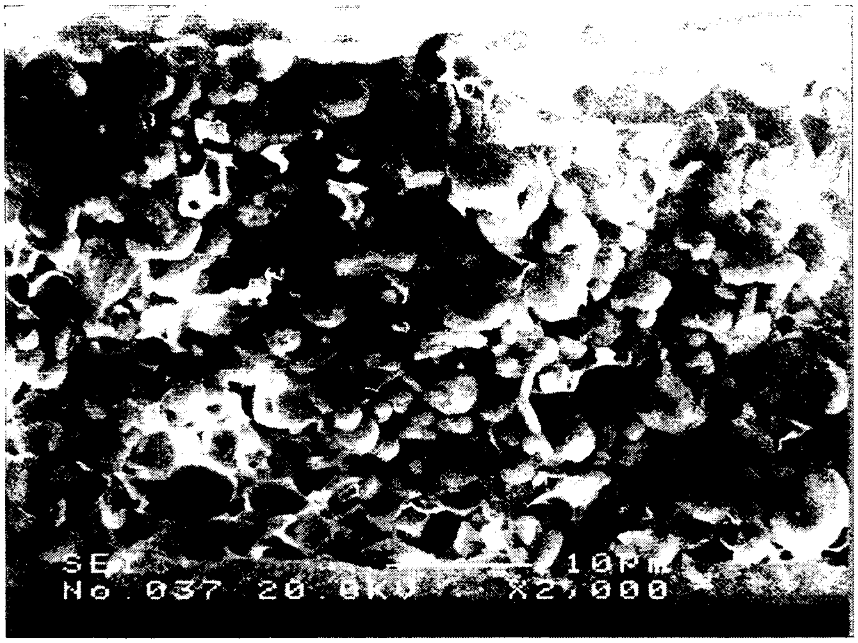
FIG. 5 is an electron micrograph showing a cross section of the protective film and phosphor layer in a bent part in the example of the present invention.

FIGS. 4 and 5 are electron micrographs showing cross sections of the protective film and phosphor layer in different parts of a fluorescent lamp in the example of the present invention. FIG. 4 shows a straight tube part and FIG. 5 is a bent part. These photographs were taken at a scale of 2,000, and the bottom straight line is 10 μm in length. In the photographs, the glass bulb, protective film, and phosphor layers are stacked in this order from bottom to top. In the protective film in the present example, the fine grains are γ-alumina ($\gamma$-$Al_2O_3$) and the large-sized grains are strontium phosphate ($Sr_2P_2O_7$). An area of the protective film which is in contact with the glass bulb forms the fine grain layer. The large-sized grains are dispersed in the fine grain layer, with their upper parts projecting upward from the fine grain layer. Some of the large-sized grains and fine grains in the protective film are buried in the phosphor layer while extending or separating from the fine grain layer.

Now, with reference to Table 1, description will be given of the relationship among the combination of varying sizes of fine grains and large-sized grains constituting the protective film and peel-off and luminous flux maintenance rate in the above example. Table 1 shows the results of lighting tests conducted on 20 fluorescent lamps having different combinations of sizes of the fine grains and large-sized grains. The fluorophor grains have an average grain size of 3 μm, and the mixture mass ratio of the fine grains to large-sized grains is 1:4. In the table, the numerical values under the words "fine grains" and "large-sized grains" indicate average grain sizes. The symbols under the word "peel-off" indicate whether or not peel-off occurred at the interface between the protective film and the phosphor layer in the bent parts 1*c* of the glass bulb 1 mainly. The numerical values (%) under the "luminous fluxmaintenance rate" were obtained after 12,000 hours of lighting. The symbols ○, Δ, and x in the table denote the nonoccurrence of peel-off, minor peel-off, and a failure to conduct a lighting test owing to significant peel-off, respectively.

TABLE 1

| Average grain size: Fine grains nm | Average grain size: Large-sized grains μm | Peel-off | Luminous flux maintenance rate 12,000 h |
|---|---|---|---|
| 25 | 5 | ○ | 84 |
| 50 | 5 | ○ | 84 |
| 100 | 5 | Δ | 80 |
| 500 | 5 | X | X |
| 1000 | 5 | X | X |
| 25 | 0.5 | X | X |
| 25 | 1 | Δ | 81 |
| 25 | 3 | ○ | 84 |
| 25 | 5 | ○ | 84 |
| 25 | 10 | X | X |

Table 1 indicates that only the grain size of the fine grains needs to fall within the range of the present invention in order to obtain the appropriate protective film. It is expected that when the fine grains have a grain size of 500 or 1,000 nm, the binding capacity based on the intermolecular force weakens to cause peel-off in the bent parts 1*c* mainly. With the composition of the protective film shown in Table 1, marked peel-off occurred when the large-sized grains had a grain size of 0.5 μm, and large-sized grains of grain size 10 μm were prone to fall off.

Now, with reference to Table 2, description will be given of the relationship, in the above example, between peel-off and the combination of the varying mixture ratio of the fine grains to large-sized grains in the protective film and the varying amount of fluorophor attached. In Table 2, the numerical values in the γ-alumina and strontium phosphate columns indicate mixture rates. The symbols in the peel-off column indicate the same evaluations as those in Table 1. Also, the blank portions in the table have the same values as the values entered in the columns above the blanks, and the entries of them are omitted. In addition, γ-alumina was formed using a water-soluble slurry.

TABLE 2

| Mixture ratio: Strontium phosphate | Mixture ratio: γ-alumina | Amount of fluorophor attached $mg/cm^2$ | Peel-off |
|---|---|---|---|
| 6 | 1 | 4 | ○ |
| | | 5 | Δ |
| | | 6 | Δ |
| | | 7 | X |
| 5 | 1 | 4 | ○ |
| | | 5 | ○ |
| | | 6 | Δ |
| | | 7 | Δ |
| 4 | 1 | 4 | ○ |
| | | 5 | ○ |

TABLE 2-continued

| Mixture ratio: Strontium phosphate | Mixture ratio: γ-alumina | Amount of fluorophor attached $mg/cm^2$ | Peel-off |
|---|---|---|---|
| | | 6 | ○ |
| | | 7 | Δ |
| 2 | 1 | 4 | ○ |
| | | 5 | ○ |
| | | 6 | Δ |
| | | 7 | Δ |
| 1 | 1 | 4 | ○ |
| | | 5 | Δ |
| | | 6 | Δ |
| | | 7 | X |

Figure 6:
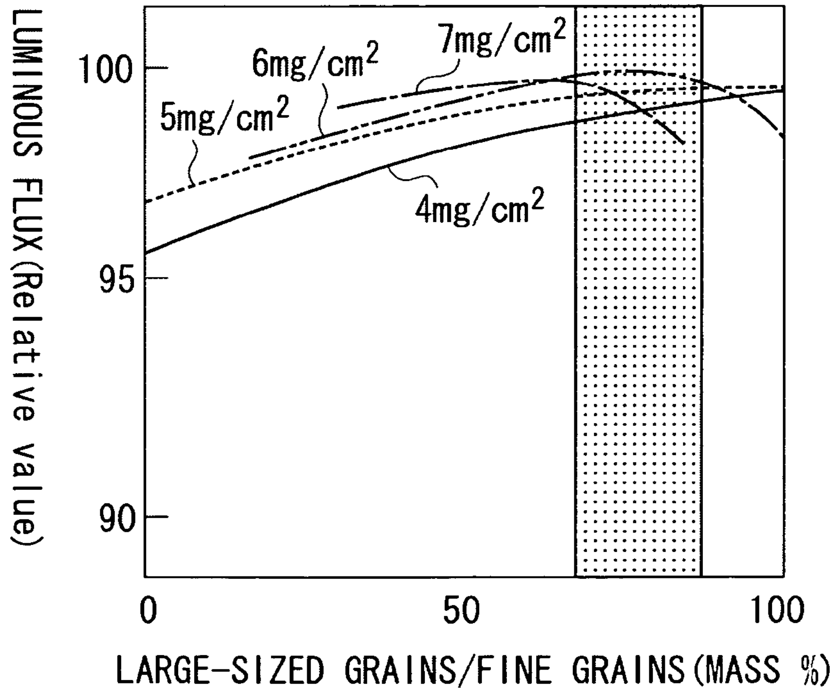
FIG. 6 is a graph showing the relationship between the compounding ratio of large-sized grains to fine grains in the protective film and the total luminous flux in the example of the present invention, using the amount of fluorophor attached, as a parameter.

FIG. 6 is a graph showing the relationship between the compounding ration of the large-sized grains/fine grains in the protective film and the total luminous flux in the example of the present invention, using the amount of fluorophor attached, as a parameter. In the figure, the axis of abscissa indicates the compounding ratio (mass %) of the large-sized grains/fine grains. The axis of ordinate indicates relative luminous flux. In addition, the amount of protective film 2 applied is 0.46 $mg/cm^2$ in this case.

As is understood from the figure, particularly preferable results were obtained when the compounding ratio of the large-sized grains/fine grains was between 67 and 88 mass %.

Figure 7:
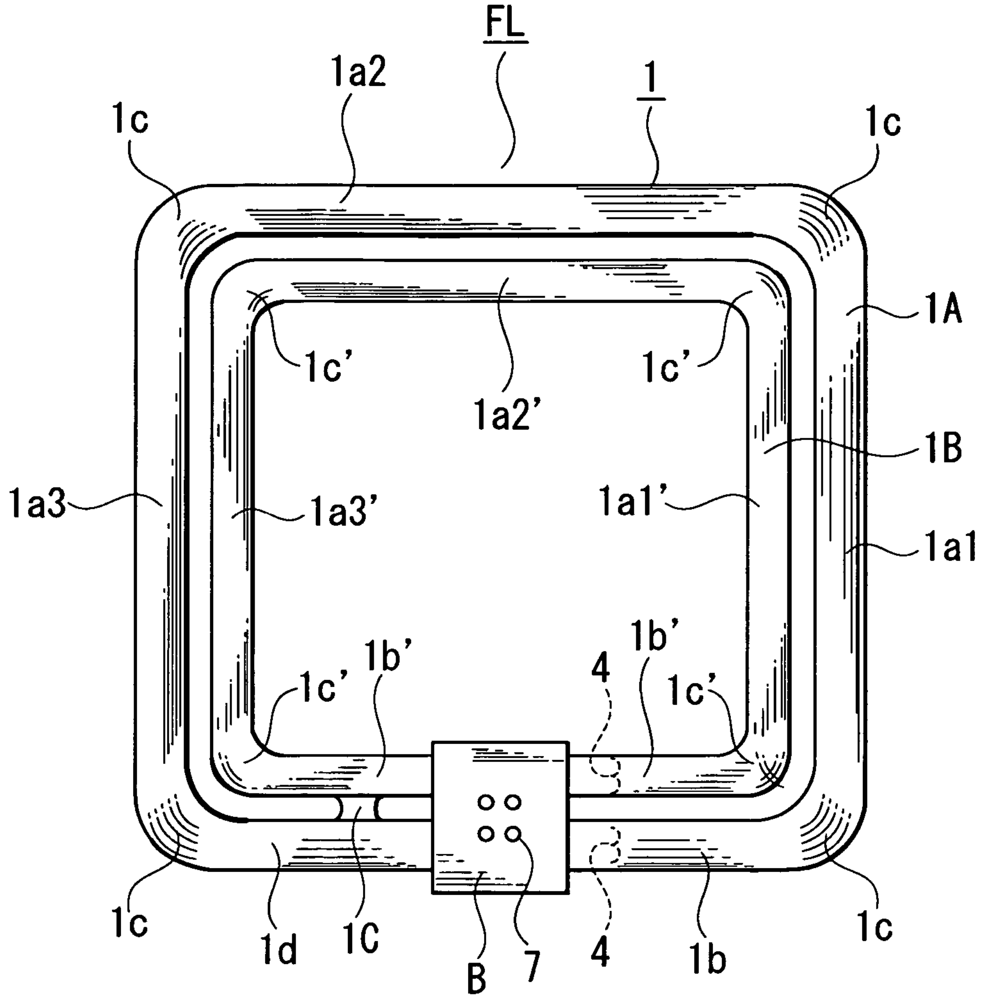
FIG. 7 is a front view showing a second embodiment for implementing the fluorescent lamp of the present invention.

FIG. 7 is a front view showing a second embodiment for implementing the fluorescent lamp of the present invention. In the present embodiment, the glass bulb 1 comprises a concentric double ring structure.

The glass bulb 1 comprises an outer annular part 1A, an inner annular part 1B, and connection parts 1C all of which are arranged in the same plane, to form a single bent discharge path. The outer annular part 1A and inner annular part 1B constitute general squares that are similar except these parts have the same outer tube diameter. The connection parts 1C connect the outer annular part 1A and the inner annular part 1B together to form a single discharge path inside the glass bulb 1. The discharge path starts from one end 1*d* belonging to a straight tube part 1*a*1 of the outer annular part 1A and inserted into the base B, passes counterclockwise through straight tube parts 1*a*2 and 1*a*3, and reaches the other end 1*d* belonging to a straight tube part 1*a*4. The discharge path further enters one end 1*d*' of the inner annular part 1B via the connection parts 1C, passes clockwise through straight tube parts 1*a*4', 1*a*3', and 1*a*2', and reaches the other end 1*d*' belonging to a straight tube part 1*a*1' and inserted into the base B.

The connection part 1C is formed by connectively welding tubes together which are projected from the outer and inner annular parts 1A and 1B by blowing out from the left ends 1*d* in the figure of the annular parts 1A and 1B. The connection part 1C is disposed 10 to 40 mm away from the leading end so as to form a space into which no discharge arc advances, inside the ends 1*d* of the outer annular part 1A and inner annular part 1B. To allow the connection part 1C to be easily manufactured by the above method, it is preferable that the size of a gap g formed between the outer annular part 1A and the inner annular part 1B be set between 5.0 and 10.0 mm. Further, although the connection part 1C is placed slightly away from the base B as shown in the figure, it may be disposed inside the base B so as not to be seen from the outside as required. Alternatively, the connection part 1C may be adjacent to the base B or may be partly placed inside the base B.

Each side of square of the outer annular part 1A of the glass bulb 1 is desirably at least 250 mm in length. Each side of square of the inner annular part 1B of the glass bulb 1 is desirably at least 200 mm in length. Both annular parts 1A and 1B have an outer tube diameter of 12 to 20 mm and a thickness of 0.8 to 1.5 mm. In the present example, each side of square of the outer annular part 1A is 300 mm, and each side of square of the inner annular part 1B is 250 mm. The inner annular part 1B also has an outer tube diameter of 14 mm and a thickness of 1.2 mm. The dimensions of bent parts 1*c* and 1*c*' of the outer and inner annular parts 1A and 1B are desirably within the following ranges. The outer annular part 1A desirably has an outer radius of curvature of 45 to 70 mm (in the present example, 56.5 mm) and an inner radius of curvature of 30 to 55 mm (in the present example, 40 mm). The inner annular part 1B desirably has an outer radius of curvature of 25 to 45 mm (in the present example, 31.5 mm) and an inner radius of curvature of 13 to 20 mm (in the present example, 15 mm). The bent parts 1*c* and 1*c*' are desirably molded so that their outer tube diameter is almost equal to that of the straight tube parts 1*a*1 to 1*a*4 and 1*a*1' to 1*a*4'.

In the base B, the base pins connect to the lead wires led out from the pair of electrodes (not shown) sealed to that end 1*d* of the outer annular part 1A which is inserted into the base B from above in the figure and to one of ends 1*d*' of the inner annular part 1B; these ends of the outer and inner annular parts 1A and 1B constitute the opposite ends of the discharge path.

The vibration resistance strength of the glass bulb 1 can be increased by filling a shock absorbing material such as silicone resin into the gap g between the outer annular part 1A and the inner annular part 1B to fix the annular parts 1A and 1B as required.

Now, description will be given of a lighting operation of a fluorescent lamp in the present embodiment. This fluorescent lamp is lighted so as to exhibit a lamp input power of at least 40 W (in the present example, 60 W), a lamp current of at least 200 mA (in the present example, 380 mA), a tube wall load of at least 0.05 W/cm$^2$, and a lamp efficiency of at least 50 lm/W (in the present example, 90 lm/W). The straight tube parts 1*a*1 to 1*a*4 and 1*a*1' to 1*a*4' have a lamp current density per cross section of at least 75 mA/cm$^2$. During lighting, the temperature of the glass bulb 1 rises to 80° C. However, the coolest part maintained at the optimum temperature is formed to set the mercury vapor pressure in the glass bulb 1 at the appropriate value. This increases the lamp efficiency.

Figure 8:
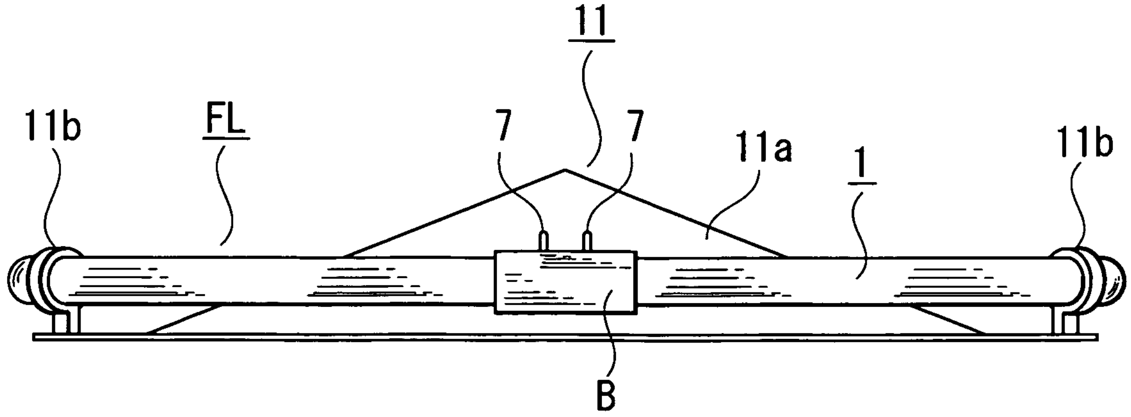
FIG. 8 is a side view showing a ceiling attached illumination instrument as an embodiment for implementing an illuminating apparatus of the present invention.

FIG. 8 is a side view showing a ceiling attached illumination instrument as an embodiment for implementing an illumination apparatus of the present invention. In the figure, the same components as those in FIG. 1 are denoted by the same reference numerals. Their description is thus omitted. The ceiling attached illumination instrument consists of an illumination instrument main body 11, a fluorescent lamp FL, and a high-frequency lighting circuit.

The illumination instrument main body 11 is attached to the ceiling and comprises a white reflector 11*a*, a lamp socket (not shown), and a lamp holder 11*b*. The white reflector 11*a* is placed in a central part of bottom surface of the illumination instrument main body 11 and is shaped like a pyramid. The lamp socket is connection means for feeding electricity to the fluorescent lamp FL. The lamp socket is disposed opposite the base B of the fluorescent lamp FL and installed around base pins p. The lamp holder 11*b* transversely surrounds the glass bulb 1 of the fluorescent lamp to hold the fluorescent lamp FL.

The fluorescent lamp FL is shown in FIG. 7. The fluorescent lamp FL is installed at a predetermined position in the illumination apparatus main body 11 by connecting the base B to the lamp socket and holding the glass bulb 1 in the lamp holder 11*b*.

The high-frequency lighting circuit (not shown) is means for receiving power input by a low-frequency AC power source, converting the input power into high-frequency power, and supplying the high-frequency power to the fluorescent lamp FL via the lamp socket 11*b*. The high-frequency lighting circuit is disposed in a space formed behind the white reflector 11*a* in the illumination instrument main body 11.

The pyramidal white reflector 11*a* in the illumination instrument main body 11 is disposed at the center of the rectangular fluorescent lamp FL. This results in rectangular light distribution toward the bottom of the instrument. The illumination instrument is thus preferable for uniformly illuminating a rectangular room.

What is claimed is:

1. A fluorescent lamp comprising:

a glass bulb having bent parts;

a protective film having a fine grain layer comprising fine grains of average grain size at most 100 nm and attached to an inner surface of the glass bulb, and large-sized grains some of which are buried in the fine grain layer, the other large-sized grains projecting from the fine grain layer;

a phosphor layer formed on the protective film of the glass bulb;

a discharge medium sealed inside the glass bulb; and discharge inducing means for generating discharge inside the glass bulb.

2. The fluorescent lamp according to claim 1, wherein the fine grain layer in the protective film has a thickness smaller than the average grain size of the large-sized grains.

3. The fluorescent lamp according to claim 1 or 2, wherein the large-sized grains in the protective film have an average grain size of at least 1 μm.

4. The fluorescent lamp according to any one of claims 1 to 3, wherein in the protective film, the fine grains have an average grain size of at most 50 nm, and the large-sized grains have an average grain size of 1 to 10 μm.

5. An illumination apparatus comprising:

an illumination apparatus main body; and the fluorescent lamp according to any one of claims 1 to 3 which is disposed in the illumination apparatus main body.

* * * * *